June 7, 1927. 1,631,409
J. C. FINN
WOODEN POT FOR PLANTS
Filed April 11, 1925
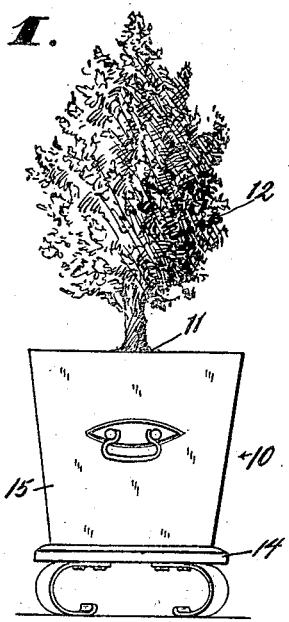
Fig. 1.
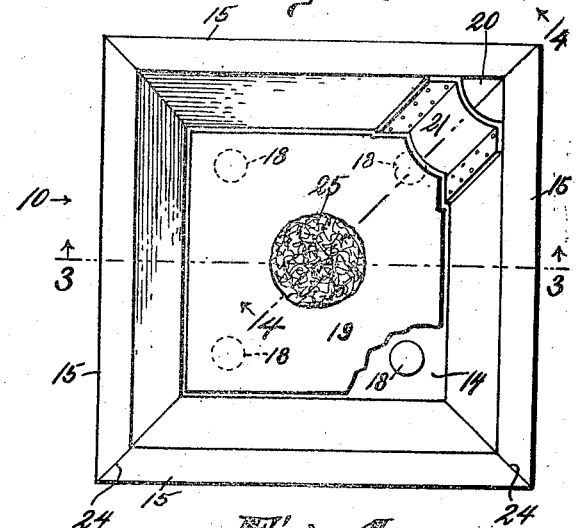
Fig. 2.
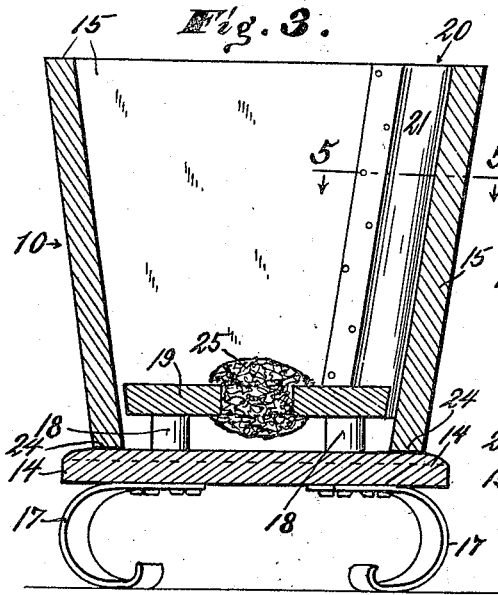
Fig. 3.
Fig. 4.
Fig. 5.
Inventor.
John Charles Finn.
by
Lockwood & Lockwood
his Attorneys.

Patented June 7, 1927.

1,631,409

UNITED STATES PATENT OFFICE.

JOHN CHARLES FINN, OF LOS ANGELES, CALIFORNIA.

WOODEN POT FOR PLANTS.

Application filed April 11, 1925. Serial No. 22,394.

An object of this invention is to provide a wooden pot for plants that is adapted to resist the injurious effects on the roots of plants of high sun temperatures such as prevail in southern California, Arizona, Nevada, New Mexico, Texas and other localities; and to that end applicant provides a pot having a heavy wooden wall that is a slow absorber and conductor of heat that functions to prevent the soil in the pot from reaching a temperature injurious to the roots of the plant. Other objects are to prevent the irrigating fluid overflowing the pot, to enable the irrigating fluid to be introduced directly to the bottom of the pot, whereby it can be carried upward by capillary attraction to the soil and plants, flowers or shrubs, and also to enable the irrigating fluid to be effectively used when it is charged with a fertilizer.

The invention is of particular value when the soil in the pot has the characteristics of adobe or other soil which very slowly absorbs water, particularly to soils subject to high sun temperatures. When an ordinary flower pot is filled with such soil it easily sun bakes or hardens so that the water quickly overflows because of the slowness with which it is absorbed and therefore the soil does not receive sufficient water and it has difficulty in reaching all parts of the soil and the roots of the plants.

The invention consists in providing a conduit for water extending from the top to the bottom of the pot and preferably in the inside whereby the water can be introduced by such conduit immediately and directly to the bottom of the pot. A further feature of the invention is a cavity provided at the bottom of the pot under the soil and plant for receiving and temporarily retaining the irrigating fluid. This chamber is preferably formed by a removable false bottom which is loosely fitted in the pot so that there is a marginal space entirely around the wall of the pot and the edge of the false bottom; and also the false bottom is supported sufficiently above the bottom of the pot to form an irrigating chamber, and the false bottom is provided with a large central opening in which is secured a sponge for keeping the soil out of the chamber below the false bottom, and also permitting the irrigating fluid under the false bottom to reach the soil and the plant by capillary attraction through the sponge and also through the marginal space between the false bottom and the wall of the pot.

The full nature of this invention will be understood from the accompanying drawings and following description and claims.

In the drawings, Figure 1 is a side elevation of the pot containing a plant. Fig. 2 is a plan view of the pot empty, one corner of the false bottom therein being broken away. Fig. 3 is a central vertical section on line 3—3 of Fig. 2. Fig. 4 is a vertical section on the line 4—4 of Fig. 2 showing a corner portion of the pot containing irrigating fluid, soil and the roots of a plant. Fig. 5 is a horizontal section on the line 5—5 of Fig. 3.

There is shown in the drawings a pot 10 adapted to contain soil 11 and the plant 12 and irrigating fluid 13. The particular pot is shown rectangular in cross section and tapers downwardly somewhat. The pot has a thick wooden bottom 14 and also thick wooden sides 15 secured together by nails 16. The bottom of the pot is supported by legs 17 and within the pot on the bottom there are lugs 18 supporting the false bottom 19 a slight distance from the bottom of the pot so as to form an irrigating chamber in the bottom of the pot under the soil. The irrigating fluid 13 is poured into a conduit 20 formed in the corner of the pot by securing a metal plate 21 across the corner as shown. The water runs down through said conduit to the bottom below the false bottom 19 and percolates upwardly to the soil around the margins of the false bottom 19 and particularly through a sponge 25 in the central opening in the false bottom. The sponge 25 is preferably dry when forced through the opening in the false bottom so that when moistened it will expand over the top and bottom edges of the opening as shown in Fig. 3, so that it is thereby secured in place. This sponge 25 keeps the soil from entering the chamber below the false bottom and also permits the irrigating fluid to ascend by capillary attraction to the lower portion of the soil in the pot and thence it passes upward until it moistens the entire body of the soil.

The pot for plants described is particularly useful when the soil is adobe or the like and it is therefore slow to absorb the water. It enables the irrigating fluid to be supplied directly to the bottom of the soil under the plant and it also is a satisfactory means for irrigating a plant with water charged with a fertilizer. Also the pot is very useful in the respect that plants growing therein are easily removed for transplanting. That is, the walls of the pot taper from the bottom upward and outward; and the false bottom is loosely fitted therein so that a plant with all the soil fully adhering to the roots can be easily removed therefrom by simply inverting the pot.

While the drawings show the pot made of wood, it is immaterial of what material it may be composed. When the pot is made of wood, the joints are preferably sealed watertight by a waterproof adhesive filling 24 that is made of white lead or other suitable material.

If the water in the pot becomes sour or otherwise and there be need to drain it, all that is necessary is to turn the pot and plant over on its side and the water will run out through the spout 20 and thus empty the chamber in the bottom of the pot of water entirely.

The invention claimed is:

A wooden pot for plants including a thick wooden bottom and side walls, a removable rigid false bottom made of wood to support the dirt in the pot and spaced from the bottom of the pot to form a water chamber and spaced from the wall of the pot and having an opening through it, a conduit on the inside of the wall of the pot leading from the top of the pot down through the false bottom to supply water directly to the water chamber, and a sponge filling the opening in the false bottom and held therein by expansion and extending above and also freely below the same into the water chamber, whereby the false bottom will be kept wet and the earth irrigated from the false bottom.

In witness whereof, I have hereunto affixed my signature.

JOHN CHARLES FINN.